Jan. 10, 1967 D. BUCCICONE 3,297,136
MAGNETIC RAIL-TYPE CONVEYOR
Filed Oct. 21, 1965 4 Sheets-Sheet 1
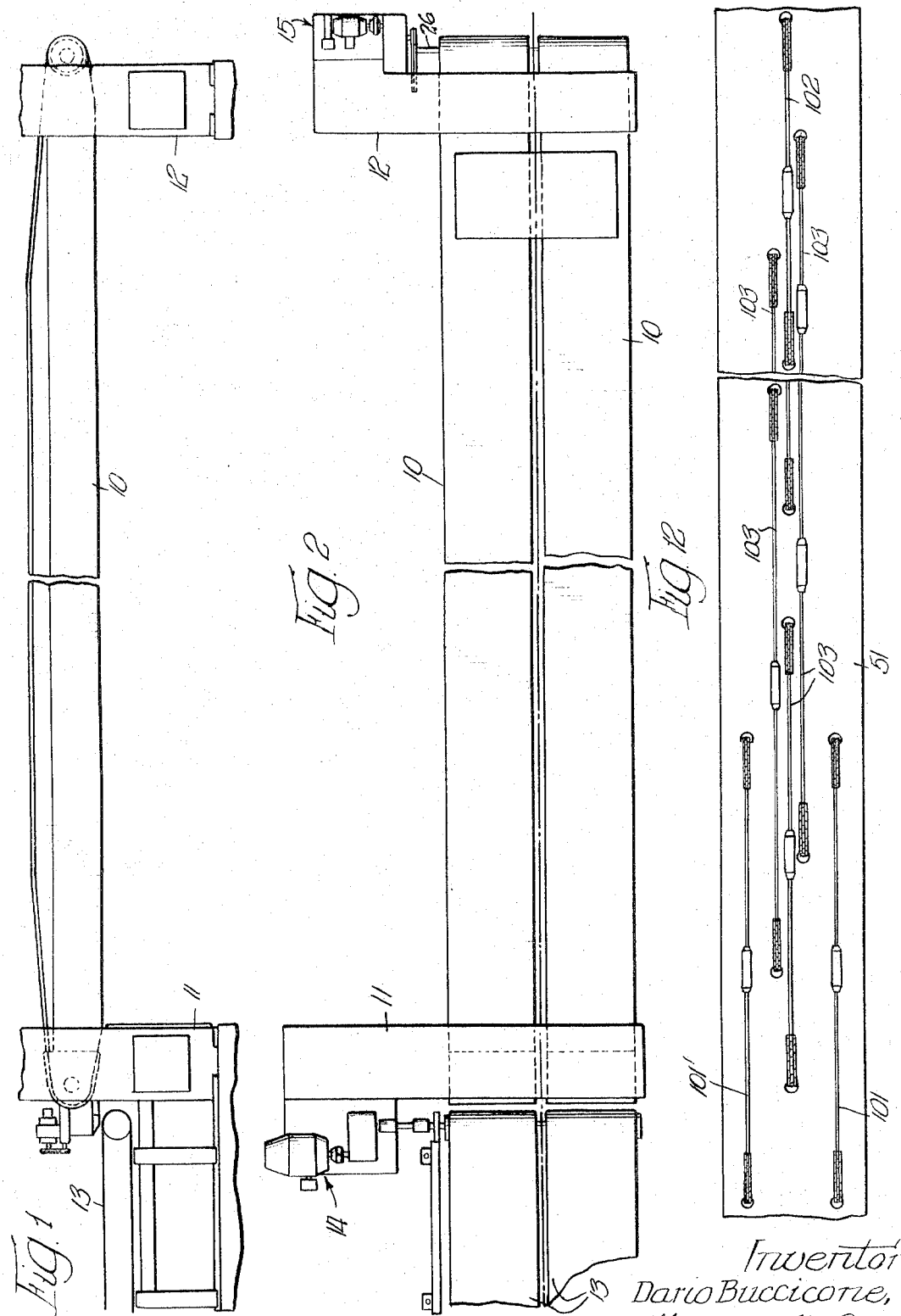
Inventor:
Dario Buccicone,

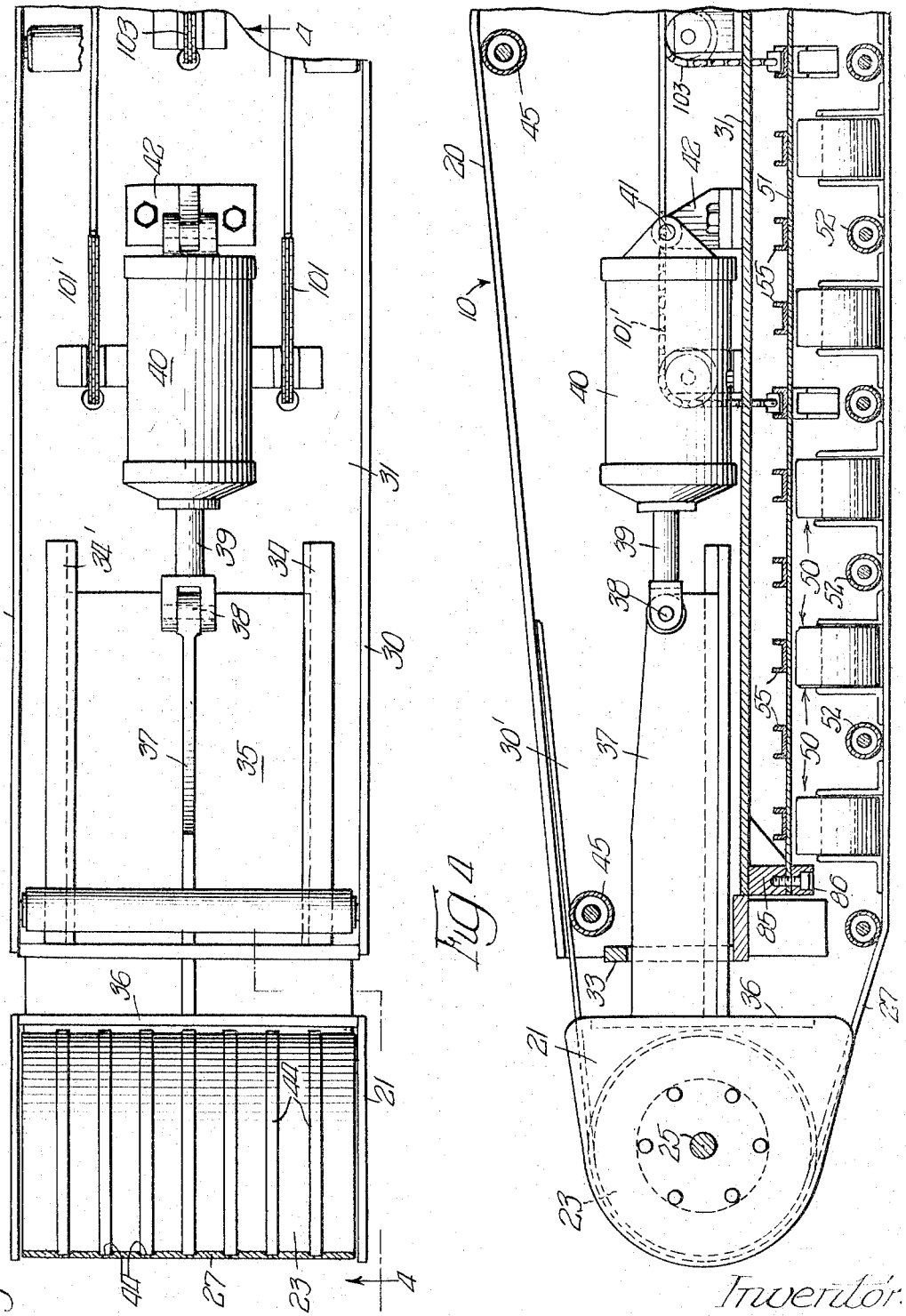

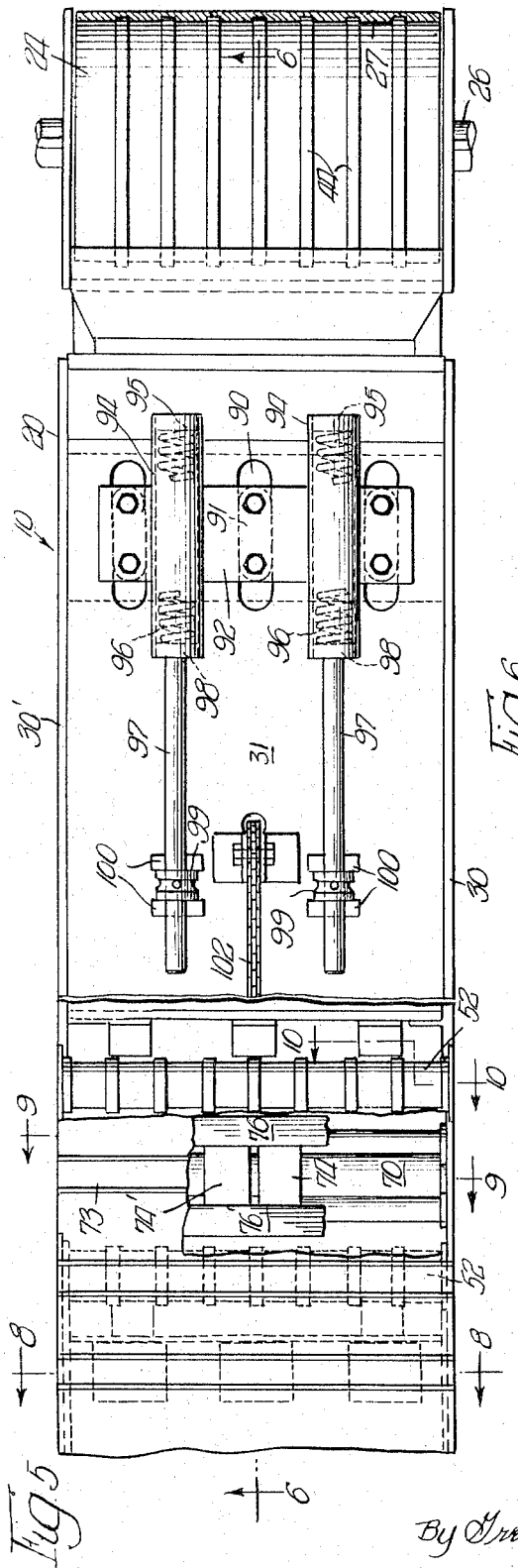

Jan. 10, 1967    D. BUCCICONE    3,297,136
MAGNETIC RAIL-TYPE CONVEYOR
Filed Oct. 21, 1965    4 Sheets-Sheet 4
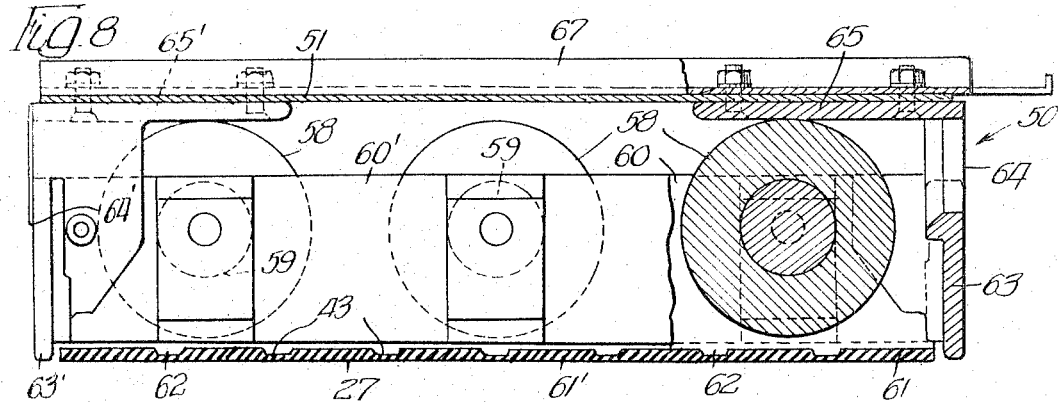
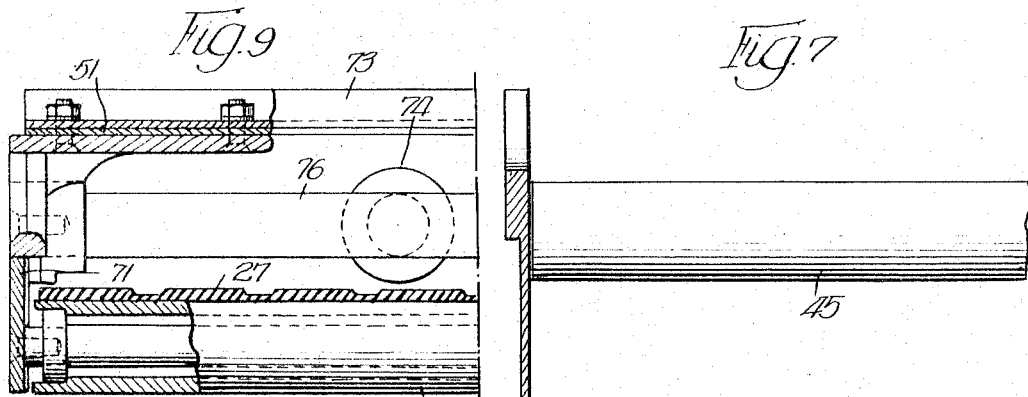
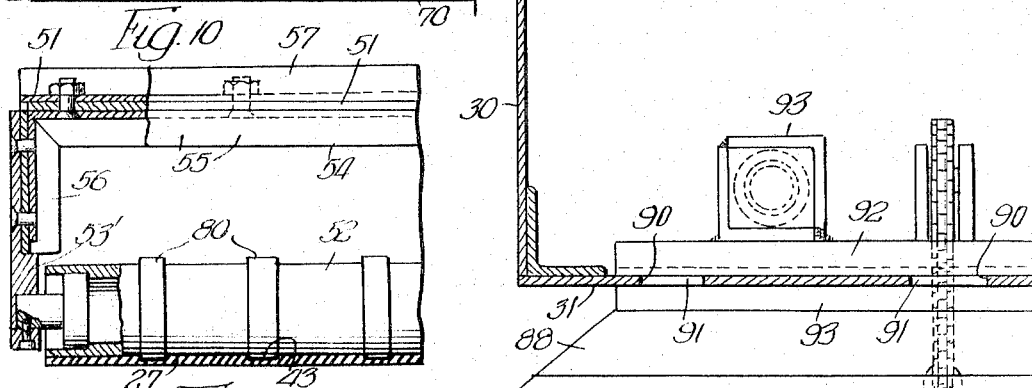
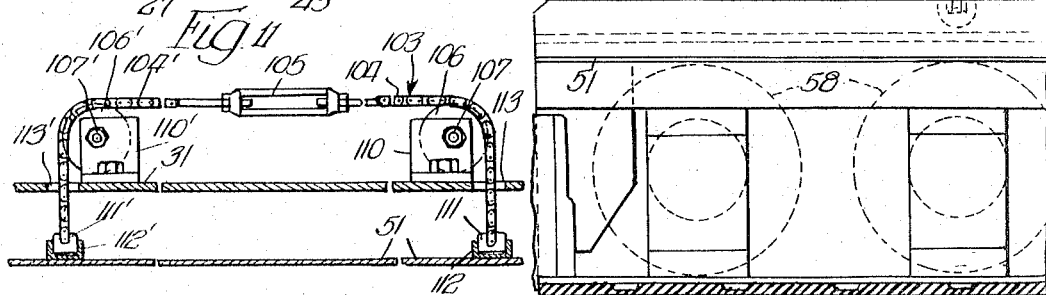
Inventor:
Dario Buccicone
By Greist Lockwood Grunawalt & Dewey

# United States Patent Office 3,297,136
Patented Jan. 10, 1967

3,297,136
MAGNETIC RAIL-TYPE CONVEYOR
Dario Buccicone, Gary, Ind., assignor to Bucciconi Engineering Co., Inc., Gary, Ind., a corporation of Indiana
Filed Oct. 21, 1965, Ser. No. 499,202
14 Claims. (Cl. 198—41)

This invention relates to article conveyors and is more particularly concerned with improvements in an overhead conveyor of the type which employs electromagnets for holding metal sheets or similar articles against the bottom surface of a traveling belt.

Overhead conveyors of rail-like form have heretofore been developed which rely on magnetic force for holding sheets of steel or similar magnetizable materials against the bottom surface of a traveling belt so as to advance the same for deposit on a pile or on another conveyor. A typical conveyor of this character is shown, for example, in my U.S. Patent No. 2,600,475, dated June 17, 1952, wherein relatively narrow belts are employed which are substantially less in width than the width at the bottom of the conveyor rail and which are arranged in spaced, guide forming grooves on the bottom surface of a belt guiding plate forming the bottom face of the conveyor rail. Due to their weight and unsupported length, it has been customary to curve or bow the bottom face of the conveyor rail in order to accommodate a portion of the belt sag and reduce the amount of tension required to keep the belt seated in the guide grooves. This type of rail conveyor has been used extensively for handling flat metal sheets which will bend sufficient to follow the bowed contour of the bottom face of the conveyor unit. However, some metal sheets, because of their thickness, or other characteristics, have too great resistance to bowing to permit them to be handled satisfactorily with this type conveyor. Various modifications have been tried in an effort to adapt the multiple belt type conveyor for the handling of sheets having a high resistance to longitudinal bowing, generally without success. Wide belt arrangements have been designed for handling sheets of this character but they have generally not been successful because of the inability to overcome the tendency to sag excessively due to their weight, particularly in conveyors of substantial length and because provision has not been made for accommodating irregularities in the sheet surface, due to warping or the like, with the result that they cannot be held against dropping away from the sheet engaging surfaces of the wide belts except through the use of very high strength magnets which greatly increases the operating costs.

One form of narrow belt conveyor has been designed for handling sheets having bowing or other surface deforming irregularities. This conveyor which is illustrated in my Patent No. 3,144,927 has been successfully employed in the handling of most sheet materials but it has been found to have certain limitations, particularly, in the handling of relatively large thick sheets where the weight of the sheet is an important factor. It is, therefore, a general object of the present invention to provide an improved rail-type conveyor unit which is of more rugged construction, more reliable in operation and better adapted for handling relatively thick heavy metal sheets, than any of the previously developed sheet conveyor arrangements.

A more specific object of the invention is to provide a rail-type electromagnetic conveyor for transporting and handling metal sheets which are characterized by a high resistance to bending in either direction, which present to the sheet contacting surface of the conveyor belt a sheet surface having waves or other irregularities therein and which may be of relatively great weight so that it is desirable that the conveyor have a flat bottom surface on which the sheet can be carried in a generally flat condition and that the traveling belt have sufficient flexibility to conform generally to irregularities in the surface of the sheet being carried.

It is another object of the invention to provide a conveyor for metal sheets wherein an endless traveling belt is supported at opposite ends of an elongate frame and a plurality of electromagnets are disposed in longitudinally spaced relation along the frame above the lower run of the belt which magnets are operated to hold the sheets against the bottom surface of the belt by electromagnetic force with the electromagnets being carried on a flat plate member which has a substantial degree of flexibility, which extends within the frame in generally parallel relation to the bottom surface of the belt, and which is suspended in said frame at a plurality of points so as to permit the plate member to flex, thereby enabling the electromagnets to move vertically which permits the belt to conform, at least in part, to irregularities in the belt engaging surfaces of the sheets as they advance along the bottom run thereof.

It is a still further object of the invention to provide a conveyor unit capable of handling relatively heavy metal sheets which have a high resistance to bending so that they must be carried with the sheets remaining in a fixed plane, wherein the conveyor is characterized by an elongate supporting frame having an endless traveling belt mounted on end supports which are longitudinally spaced, with a plurality of electromagnetic assemblies spaced longitudinally above the lower run of the belt and supported on an elongate, relatively thin, flexible metal sheet member which is suspended in the frame by attachment to a plurality of chains, or other cable forming members, mounted on fixed pulleys with their ends attached to the top surface of the magnet supporting sheets at longitudinally spaced points so that the flexible metal sheet will permit the electromagnetic assemblies to rise and fall according to the contour of the surface of a sheet as it is advanced beneath the conveyor and to permit a predetermined degree of conformity to surface irregularities on the sheet in both longitudinal and transverse directions.

These and other objects and advantages of the invention will be apparent from a consideration of the conveyor structure which is shown by way of illustration in the accompanying drawings wherein:

FIGURE 1 is a side elevational view, with portions broken away, of a sheet piler employing a magnetic rail conveyor unit which incorporates therein the principal features of the present invention;

FIGURE 2 is a partial plan view, with portions broken away, or omitted, of the piler apparatus of FIGURE 1;

FIGURE 3 is a plan view, to an enlarged scale, of the entrance end of one of the conveyor rail units;

FIGURE 4 is a longitudinal section, taken on the line 4—4 of FIGURE 3;

FIGURE 5 is a plan view, to an enlarged scale, of a portion of the rail unit showing particularly the exit end thereof and a portion intermediate its ends;

FIGURE 6 is a longitudinal section taken on the line 6—6 of FIGURE 5;

FIGURE 7 is a partial cross section taken on the line 7—7 of FIGURE 6, to an enlarged scale;

FIGURE 8 is a partial cross section taken on the line 8—8 of FIGURE 5, to an enlarged scale;

FIGURE 9 is a partial cross section, taken on the line 9—9 of FIGURE 5, to an enlarged scale;

FIGURE 10 is a partial cross section taken on the line 10—10 of FIGURE 5, to an enlarged scale;

FIGURE 11 is a partial, longitudinal section, with portions broken away, showing a single supporting chain for the mounting plate on which the magnetic assemblies are carried; and FIGURE 12 is a view, partially schematic, showing the arrangement of the chains for suspending the mounting plate on which the magnetic assemblies are carried.

Referring to FIGURES 1 and 2, there is illustrated a piler assembly comprising a pair of rail-like conveyor units 10 mounted in parallel, side-by-side relation on upright end supports 11 and 12. The assembly shown embodies the main elements of the sheet piler with suitable means (not shown) for supporting a pile of sheets between the end frames 11 and 12 and suitable end stop and back stop devices (not shown). An infeed conveyor 13 with associated drive means 14 is mounted at the entrance end of the piler and suitable drive means 15 for the conveyor units at the opposite end thereof.

Each of the conveyor rail units 10 (FIGURES 3 to 6) comprises an elongate support frame 20 with pulley housings 21 and 22 mounted at the entrance and exit ends thereof, respectively. Belt supporting idler and drive pulleys or rollers 23 and 24 are mounted on transversely extending shafts 25 and 26 in the housings 21 and 22 for supporting at opposite ends of the frame 20 a traveling belt 27 of a width sufficient for the bottom run to extend substantially the full width across the bottom face of the unit (FIGURE 8).

The frame 20 of each conveyor rail unit 10 comprises vertically disposed, laterally spaced, parallel, elongate side plates 30 and 30' which are connected by cross members at their ends and intermediate the same by a bottom plate 31. At the discharge end of the conveyor unit, the vertical side plates 30 and 30' are connected by a cross frame member 32 which constitutes a bracket to which the housing 22 for the drive pulley 24 is secured. At the entrance end of the conveyor unit the side plates 30 and 30' are connected by a cross frame member 33 from which there extends in the direction of the center of the conveyor a pair of laterally spaced, guide forming rail members 34 and 34' which receive a slide plate 35 extending from the inside vertical wall 36 of the housing 21 for the idler pulley 23. A rib forming plate member 37 is upstanding in the longitudinal center of the slide plate 35 and has a pivotal connection at 38 with the end of a piston 39 extending from the air cylinder 40 which has its other end connected at 41 to a bracket 42 mounted on the bottom frame plate 31. The air cylinder 40, of course, controls the tension in the belt 27 by sliding movement of the housing 21 in which the idler pulley 23 is mounted.

The belt 27 (FIGURE 8) is relatively wide and is provided on its pulley engaging face with longitudinally extending, transversely spaced slots or grooves 43 which receive co-operating circumferential ribs 44 on the end pulleys 23 and 24. A plurality of longitudinally spaced cross rollers 45 support the upper return run of the belt 27. The lower run of the belt 27 which provides a downwardly facing sheet engaging and carrying surface is guided in a flat plane generally parallel with the longitudinally extending bottom plate 31 of the frame 20.

A plurality of longitudinally spaced, electromagnetic assemblies 50 are supported in depending relation on the lower face of the frame 20 by means of a longitudinally extending metal plate structure 51 which for reasons of manufacture and assembly may comprise a plurality of connected plate sections but which functions as a single unit. The magnet supporting plate 51 is suspended beneath the bottom frame plate 31 in a manner which is hereinafter described. Belt supporting or back-up rollers 52 (FIGURE 10) are mounted between the magnet assemblies 50. Each roller 52 is journaled at its opposite ends in bearing plates 53 and 53' which depend from the opposite ends of an inverted U-shaped frame 54. The frame 54, which is formed of a downwardly opening top cross member 55 and angular depending end members 56 and 56', is bolted or otherwise secured beneath the supporting plate 51 with an upwardly opening cross channel member 57 mounted on the top face of the plate in vertical alignment with the top channel 55 of the cross frame 54.

Each of the electromagnetic assemblies 50 comprises three spaced coil members 58 (FIGURE 8) mounted on cores 59 which extend between upstanding legs of parallel, transversely extending, spaced angle members 60 and 60' having their bottom legs 61 and 61' formed with ribs 62 extending in parallel relation longitudinally of the conveyor and received in the grooves 42 in the belt 27. The angle members 60 and 60' constitute extension of the poles 57 and with the ribs 62 riding the grooves 42 provide a flux path so as to exert a magnetic pull through the relatively thin areas of the belt 27 in the bottom of the grooves 42. The angle members 60 and 60' are connected at opposite ends to vertically disposed legs 63 and 63' of angle brackets 64 and 64' which have inwardly extending top legs 65 and 65' bolted or otherwise secured to the support plate 51 with a co-operating, upwardly facing channel member 67 secured in vertically aligned relation on the top face of the supporting plate 51. The brackets 64 and 64' are formed of non-magnetic material so as to enable each magnetic assembly 45 to function as a unit in the application of magnetic force through the belt 27.

At predetermined points spaced longitudinally of the conveyor unit and intermediate the ends thereof the lower run of the belt 27 is supported against sagging by passing it over a supporting roller 70 (FIGURES 5, 6 and 9) which is journaled in depending end plates 71 and 71' of non-magnetic material, for example, stainless steel, with the latter being secured by end angle brackets 72 and 72' to the bottom face of the supporting plate 51. An upwardly opening channel bar 73 extends along the top face of the supporting plate 51 and connects the end bracket members 72 and 72'. The roller 70 and its associated supporting mechanism replaces a magnet assembly 50 and provision is made for applying a magnetic force to overcome any tendency for a sheet to drop away from the bottom face of the conveyor as its advances beneath the belt supporting roller 70. A pair of coils 74 and 74' are mounted with their cores 75 and 75' extending longitudinally of the frame 20 between longitudinally spaced cross bars 76 and 76' which extend transversely in parallel relation on the frame above the roller 70 and are connected at their ends to the end brackets 72 and 72'. A pair of steel rollers 77 and 77' extend between the end brackets 72 and 72' in parallel relation below and on opposite sides of the roller 70. A pair of steel belt guards 78 and 78' also extend between the end brackets 72 and 72' and co-operate with the rollers 77 and 77' is providing a flux path across beneath the roller 70, the rollers 77 and 77' being positioned for engagement with sheets advancing beneath the roller 70. The two belt supporting rollers 52 which are adjacent the roller 70 are provided with circumferential ribs 80 which engaged in the belt grooves 43 and hold the belt 27 against sidewise movement. The ribs 80 may be omitted on the rollers 52 which are positioned between the magnet assemblies 50.

The plate 51 has one end mounted in fixed position relative to the frame 20. At the entrance end of the conveyor unit the end of plate 51 is secured to a cross bar 85 depending from the end of the bottom frame plate 31. A clamp bar 86 may be employed to hold the plate end on the bar 85. At the other end of the conveyor frame 20 the plate 51 is attached to a cross frame 88 which is slidably mounted on the end of the bottom frame plate 31, the latter having transversely spaced, longitudinally extending slots 90 in which slide bar members 91 on the top of the frame 88 extend. The slide bars 91 are connected between the bottom face of a cross plate 92 and the top face of a cross plate 93, the plates 92 and 93 being disposed above and below the support plate 31, respectively. A pair of parallel, laterally spaced, longitudinally extending spring housings 94 are mounted on the top cross plate 93. Each housing 94 has one end plugged at 95 so as to form a seat for a compression spring 96, the opposite end of the spring being seated on the end of an adjusting rod 97 which has a shoulder forming washer 98 operating after the fashion of a piston in the housing 94. Each of the rods 97 has, on its end, an adjusting nut 99 which is trapped between a pair of parallel, upstanding bracket members 100 on the top of the plate 31 with the bracket members 100 having aligned apertures for receiving the adjusting rod 97. The plate 51 is suspended intermediate its ends by attachment to the ends of a series of longitudinally extending, cable forming chains, arranged as indicated in FIGURE 12. At the entrance end of the conveyor two endmost chains 101 and 101' are arranged in parallel, laterally spaced relation on opposite sides of the belt tensioning cylinder 38. At the exit or discharge end of the conveyor there is a single chain, indicated at 102, which is arranged on the center line of the conveyor with the leading end between the rods 97. The chains 103 which are arranged at intermediate points between the ends of the frame 20 are located adjacent the longitudinal center line of the frame 20 as shown in FIGURE 12. Each plate suspending chain is mounted on the bottom frame plate 31 and attached to the magnet supporting plate 51 in the same manner, the arrangement being shown in FIGURE 11 in connection with an intermediate chain 103. The chain 103 is formed in two sections 104 and 104' with a turnbuckle and threaded rod connection 105 so as to adjust the over-all length of the same. The chain sections 104 and 104' are supported on sprockets 106 and 106' on small cross shafts 107 and 107' journaled in bearing brackets 110 and 110' extending above the frame plate 31 in longitudinally spaced relation. Downwardly extending ends of the chain sections 104 and 104' are connected by brackets 111 and 111' to top cross channel members 112 and 112' on the magnet supporting plate 51 with the frame plate 31 being apertured at 113 and 113' to accommodate the chain sections and permit movement thereof.

In the operation of the conveyor unit 10 the sheets are fed to the normally flat bottom surface of the unit by the entrance conveyor 13 and held against the bottom run of the belt 27 by magnetic force, the magnets in the assemblies 50 being supplied with the required current. Sheets which are flat and without surface deviations so that the top surfaces are in a single plane will be advanced by the driven belt 27 with the magnets exerting maximum pull on the sheet. Sheets which have surface deviations due to warping, or the like, will cause the magnet supporting plate 51 to flex in order that the belt may conform generally to the surface deviations and the magnets will rise and fall with the belt so that they exert maximum pull through the belt and prevent separation of the belt and the sheet which could otherwise occur, when the sheet is relatively stiff, as in the case of thick sheets, which do not bend with the application of the magnetic force.

While the conveyor units 10 are shown employed in a sheet piler, their use is not restricted to sheet piling operations since they may be employed for conveying or transporting sheets or similar materials in other operations. The particular materials and specific structural details referred to are illustrative and it is understood that other materials and different structural details may be resorted to within the spirit of the invention.

I claim:

1. A conveyor for metal sheets which comprises an elongate frame having an endless traveling belt supported on end pulleys mounted in longitudinally spaced relation on said frame, a plurality of magnets disposed in longitudinally spaced relation along said frame, which magnets are operative to hold the sheets against the bottom surfaces of the belt by magnetic force, means including an elongate, thin, flat plate member having substantial flexibility for supporting said magnets, said plate member extending along said frame in generally parallel relation to the bottom surface of the belt, and means for suspending said plate member at longitudinally spaced points so as to permit the plate member to flex and thereby enable the belt and associated magnets to move vertically in order that the belt may conform to the belt engaging surfaces of the sheets as the sheets advance along the bottom surface of the belt.

2. A conveyor for metal sheets which comprises an elongate frame having an endless traveling belt of substantial width carried on rotatable end supports arranged in longitudinally spaced relation on said frame, a plurality of magnets disposed in longitudinally spaced relation along said frame, which magnets are operative to hold the sheets against the bottom surfaces of the belt by magnetic force, an elongate, thin, flat plate member having substantial flexibility mounted in said frame for supporting said magnets, said plate member extending in generally parallel relation to the bottom surfaces of the belts, and suspending members for said plate member connected to said plate member at longitudinally spaced points so as to permit the plate member to flex and cause the magnets to move vertically with the belt so that the belt will conform to the uppermost surfaces of sheets advanced along the bottom surface of the belt and the distance between the uppermost surface of each sheet and the magnets will be held substantially constant.

3. An overhead conveying apparatus for metal sheets comprising an elongate support frame having one or more endless traveling belts carried on pulleys mounted at opposite ends of said frame, a plurality of longitudinally spaced magnet assemblies mounted for vertical movement on said frame above the lower run of the traveling belt which magnet assemblies are operative to exert a magnetic force through the belt and to hold the sheets against the lower surface thereof while it is advanced thereby, and means forming a support for the magnet assemblies which includes an elongate plate member extending in a generally parallel plane above the lower surface of the belt with the magnet assemblies suspended in longitudinally spaced relation therefrom, said plate being supported at spaced points so as to permit limited vertical movement of the magnet assemblies sufficient to enable the belt to conform generally to the surface of the sheet presented for engagement with the belt as the sheet is progressively advanced regardless of abnormal surface deviations due to warping and the like.

4. An overhead conveying apparatus as recited in claim 3 and said magnet assemblies each comprising a plurality of magnets arranged in spaced relation transversely of the support frame.

5. An overhead conveying apparatus for metal sheets comprising an elongate support frame having a relatively wide traveling belt having parallel, longitudinal grooves on the inside face which provide belt areas of reduced thickness supported on pulleys mounted at opposite ends of said support frame, a plurality of longitudinally spaced, magnet assemblies mounted for vertical movement on said frame above the lower run of said belts and having core extensions with parallel ribs adapted to be received in the belt grooves so as to exert maximum magnetic force through the belt areas of reduced thickness and to hold the sheets against the lower surface for advance by the traveling belt, and a support for the magnet assemblies which includes an elongate plate member extending in a generally parallel plane above the lower surface of the belt with the magnet assemblies being suspended in longitudinally spaced relation from the bottom face thereof, and means for supporting said plate member at spaced points so as to permit limited vertical movement of the magnet assemblies sufficient to enable the belt to conform to surface deviations and to carry each sheet in a straight path as it is advanced by the belt.

6. A magnetic conveyor for metal sheets comprising an elongate frame having an endless traveling belt mounted thereon, and a plurality of magnets disposed in longitudinally spaced relation along said frame which magnets are operative to hold the sheets against the bottom surface of the belt by magnetic force, and means for supporting said magnets for limited vertical movement which comprises an elongate flat plate-like member which plate-like member has sufficient flexibility to permit vertical movement thereof according to variations in the belt engaging sheet surface so that belt engagement with the surfaces of the sheets is substantially uniform with deviations from the normal plane of the sheet being accommodated as each sheet is advanced along the conveyor.

7. A magnetic conveyor for metal sheets comprising an elongate frame having an endless traveling belt mounted thereon, and a plurality of magnets disposed in longitudinal and laterally spaced relation along said frame which magnets are operative to hold the sheets against the bottom surface of the belt by magnetic force, means for supporting said magnets for limited vertical movement which comprises an elongate flat, plate-like member having sufficient flexibility to permit vertical movement thereof according to variations in the belt engaging sheet surface so that belt engagement with the surfaces of the sheets is substantially uniform and deviations from the normal plane of the sheet are accommodated without substantially reducing the magnetic pull on the sheet.

8. A magnetic conveyor as recited in claim 7, and means for securing said plate-like member in fixed position at one end thereof, said plate-like member having a longitudinal sliding connection with the frame at the other end thereof, and a plurality of cable forming plate suspension members having their ends connected to said plate-like member and movably connected to said frame intermediate the ends thereof.

9. A magnetic conveyor for metal sheets comprising an elongate frame having an endless traveling belt mounted thereon, and a plurality of magnets disposed in longitudinal and transversely spaced relation along said frame which magnets are operative to hold the sheets against the bottom surface of the belt by magnetic force, means for supporting said magnets for limited vertical movement which comprises an elongate flat, plate-like member having a degree of flexibility sufficient to permit it to flex in accordance with variations in the belt engaging surface of the sheet so as to enable the belts to engage uniformly with the surfaces of the sheets and accommodate warping and other surface deforming irregularities in the sheets as they are advanced along the conveyor.

10. A magnetic conveyor as recited in claim 9, and said means for supporting said magnets including means for attaching said plate-like member at one end to said frame, means for applying tension in a longitudinal direction at the other end thereof, and means having a limited vertical movement in response to vertical forces for suspending said plate-like member at spaced points intermediate its ends so as to normally hold said plate-like member in a flat plane while permitting it to flex in response to pressures due to variations in the sheet surfaces.

11. A magnetic conveyor as recited in claim 10, and said means for suspending said plate-like member comprising a series of longitudinally extending cable forming members having their ends attached at longitudinally spaced points to said plate-like member and supported on longitudinally spaced pulleys on said frame.

12. An elongate sheet conveyor unit comprising a longitudinally extending frame, a plurality of longitudinally spaced magnetic assemblies each mounted for limited movement in a vertical direction on the frame, an endless traveling belt having its lower run disposed below the magnetic assemblies, said magnetic assemblies co-operating with the belt to exert magnetic force sufficient to pull the sheet against the traveling belt, means for advancing successive sheets in a path beneath the belt and a support for the magnetic assemblies which comprises an elongate, relatively thin, metal plate member which is flexible and means for suspending the plate member at spaced points along said frame which comprises a series of cable forming members having their ends attached to the top surface of the plate member at longitudinally spaced points and movably supported on said frame whereby the supporting plate member will flex so as to permit the magnetic assemblies to rise and fall according to the contour of each sheet surface as the sheet is advanced beneath the conveyor.

13. A conveyor for metal sheets which comprises an elongate frame having an endless traveling belt supported on end pulleys mounted in longitudinally spaced relation on said frame with the bottom run of the belt disposed in a substantially flat plane and forming the bottom face of the conveyor, a plurality of magnets disposed in longitudinally spaced relation along said frame, which magnets are operative to hold the sheets against the bottom surface of the belt by magnetic force, means including an elongate thin, flat plate member having substantial flexibility for supporting said magnets, said plate member extending within said frame in generally parallel relation to the bottom surfaces of the belts, means for suspending said plate member at longitudinally spaced points so as to permit the plate member to flex and thereby enable the magnets to move vertically with the belt and permit the belt to conform to surface deviations due to warping or the like in the sheets advanced along the bottom surface of the belt, and belt supporting roller assemblies spaced at intervals along said frame and between said magnets each including a cross roller over which the belt is trained to prevent undue belt sagging and a pair of magnets associated with said cross roller for exerting a magnetic pull on the sheet while it is free of the belt as it advances beneath said belt supporting cross roller.

14. A conveyor for metal sheets which comprises an elongate frame having an endless traveling belt supported on end pulleys mounted in longitudinally spaced relation on said frame with the bottom run of the belt traveling in a plane which is normally flat and forming the bottom face of the conveyor, a plurality of magnet assemblies disposed in longitudinally spaced, transversely extending relation along said frame, which magnets are operative to hold metal sheets against the bottom surface of the belt by magnetic force, means for supporting said magnets within said frame and belt supporting assemblies including a transversely extending roller disposed at longitudinally spaced intervals on said frame, each belt supporting assembly extending between a pair of magnet assemblies, a pair of magnets supported above said transversely extending, belt supporting roller on a pair of longitudinally spaced cross bars constituting core extensions for said magnets, a pair of sheet engaging steel rolls spaced below said cross bars and co-operating with said cross bars to provide a flux path for exerting a magnetic force to hold the sheets against dropping away from the bottom of the conveyor as they advance beneath said belt supporting roller.

References Cited by the Examiner
UNITED STATES PATENTS 3,144,927    8/1964    Buccicone _____ 198—41

EVON C. BLUNK, *Primary Examiner.*

E. A. SROKA, *Assistant Examiner.*